United States Patent
Kaneda et al.

(10) Patent No.: US 12,278,066 B2
(45) Date of Patent: Apr. 15, 2025

(54) LEVER SWITCH MOUNTED ON VEHICLE

(71) Applicant: TOYO DENSO KABUSHIKI KAISHA, Tokyo (JP)

(72) Inventors: Ryohei Kaneda, Tsurugashima (JP); Fuminori Takayama, Tsurugashima (JP); Michitaka Kobayashi, Wako (JP); Masahiko Shimada, Wako (JP)

(73) Assignee: TOYO DENSO KABUSHIKI KAISHA, Tokyo (JP)

( * ) Notice: Subject to any disclaimer, the term of this patent is extended or adjusted under 35 U.S.C. 154(b) by 777 days.

(21) Appl. No.: 16/919,174

(22) Filed: Jul. 2, 2020

(65) Prior Publication Data
US 2021/0005408 A1  Jan. 7, 2021

(30) Foreign Application Priority Data

Jul. 5, 2019  (JP) .................................. 2019-125834

(51) Int. Cl.
*H01H 21/60* (2006.01)
*B60Q 1/42* (2006.01)
*B60R 16/00* (2006.01)
*G05G 1/04* (2006.01)

(52) U.S. Cl.
CPC .............. *H01H 21/60* (2013.01); *B60Q 1/42* (2013.01); *B60R 16/005* (2013.01); *G05G 1/04* (2013.01); *H01H 2215/00* (2013.01); *H01H 2231/026* (2013.01)

(58) Field of Classification Search
None
See application file for complete search history.

(56) References Cited

U.S. PATENT DOCUMENTS

| | | | | |
|---|---|---|---|---|
| 4,725,702 A | * | 2/1988 | Kamisada | ............... H01H 23/02 200/16 F |
| 4,851,619 A | * | 7/1989 | Fujita | ................. H01H 11/0056 200/6 R |

(Continued)

FOREIGN PATENT DOCUMENTS

JP    2017-103177 A    6/2017

OTHER PUBLICATIONS

The American Heritage Roget's Thesaurus. (2014). Retrieved Mar. 13, 2023 from https://www.thefreedictionary.com/curved.*

(Continued)

*Primary Examiner* — Felix O Figueroa
(74) *Attorney, Agent, or Firm* — Keating & Bennett, LLP (57) ABSTRACT

A lever switch with an improved operation feeling includes a clicking surface of a click feeling generator that abuts with an end portion of a switch moving body turning about a turn fulcrum in response to an operation of an operation lever, and generates a click feeling by causing a reaction force against the operation of the operation lever. A region of the clicking surface forms a shape of a curved face convex toward the turn fulcrum, where the region ranges between a first position where the reaction force starts to decrease from a peak reaction force and a second position where the reaction force becomes zero, in a stroke in which the switch moving body turns from a first angle to a second angle. The radius of curvature of the region is a maximum at a portion adjoining the first position in the region.

8 Claims, 6 Drawing Sheets

(56) References Cited

U.S. PATENT DOCUMENTS

| | | | | |
|---|---|---|---|---|
| 6,091,038 A * | 7/2000 | Murphy | ............... | H01H 23/006 |
| | | | | 200/253 |
| 6,756,556 B2 * | 6/2004 | Kubota | ................ | H01H 23/168 |
| | | | | 200/517 |
| 7,009,127 B2 * | 3/2006 | Hoelzle | ................ | H01H 23/025 |
| | | | | 200/315 |
| 7,026,565 B1 * | 4/2006 | Lee | ...................... | H01H 23/205 |
| | | | | 200/339 |
| 10,566,153 B2 * | 2/2020 | Suzuki | ................... | H01H 21/04 |
| 10,800,324 B2 * | 10/2020 | Takayama | .............. | B60Q 1/425 |
| 2021/0005408 A1 * | 1/2021 | Kaneda | ................. | H01H 21/60 |

OTHER PUBLICATIONS

English translation for JP 2017103177 A (Naito); original published Jun. 8, 2017.*

* cited by examiner

LEVER SWITCH MOUNTED ON VEHICLE

BACKGROUND OF THE INVENTION

Field of the Invention

The present invention relates to a lever switch mounted on a vehicle or the like.

Description of the Related Art

Conventionally, there has been known a lever switch that is mounted on a vehicle and generates a click feeling when a switch moving body turned by an operation of an operation lever abuts with a clicking surface of a click feeling generator. For example, a lever switch described in Japanese Laid-open Patent Publication (Kokai) No. 2017-103177 generates a click feeling when a clicking piece connected to a turning member as an operation lever moves on a clicking surface. In particular, in a stroke in which the clicking piece moves on the clicking surface, a drop after the peak in a reaction force against an operation to turn the operation lever generates a click feeling.

The lever switch disclosed in Japanese Laid-open Patent Publication (Kokai) No. 2017-103177 restrains collision noises between the clicking piece and the clicking surface in order to achieve quietness of in-vehicle space. However, if the drop of the reaction force immediately after the peak is too large, such a reaction force may give an operator an unpleasant feeling in hand, which was a problem in operation feeling of the lever switch.

SUMMARY OF THE INVENTION

The present invention provides a lever switch with an improved operation feeling.

Accordingly, an aspect of the present invention provides a lever switch including: a case; a click feeling generator disposed inside the case; and a switch moving body that is disposed inside the click feeling generator and turns with respect to the case about a turn fulcrum, in response to an operation of an operation lever. The click feeling generator includes a clicking surface that abuts with an end portion of the switch moving body and generates a click feeling by causing a reaction force against the operation of the operation lever. A region of the clicking surface, being from a first position to a second position, forms a shape of a convex curved face being convex toward the turn fulcrum, where the first position and the second position are a position where the reaction force starts to decrease from a peak and a position where the reaction force becomes zero, respectively, in a stroke in which the switch moving body turns from a first angle formed by the click feeling generator with the switch moving body to a second angle formed by the click feeling generator with the switch moving body and being different from the first angle. A radius of curvature of the region is not constant and is the maximum at a portion adjoining the first position in the region.

According to the present invention, an operation feeling of the lever switch can be improved.

Further features of the present invention will become apparent from the following description of exemplary embodiments with reference to the attached drawings.

DESCRIPTION OF THE EMBODIMENTS

Hereinafter, an embodiment of the present invention is described with reference to drawings. It should be noted that, here, an example will be described in which the present invention is applied to a lever switch that controls a direction indicator, as a lever switch mounted on a vehicle or the like. However, the present invention may be applied to a lever switch that controls other than the direction indicator.

Figure 1:
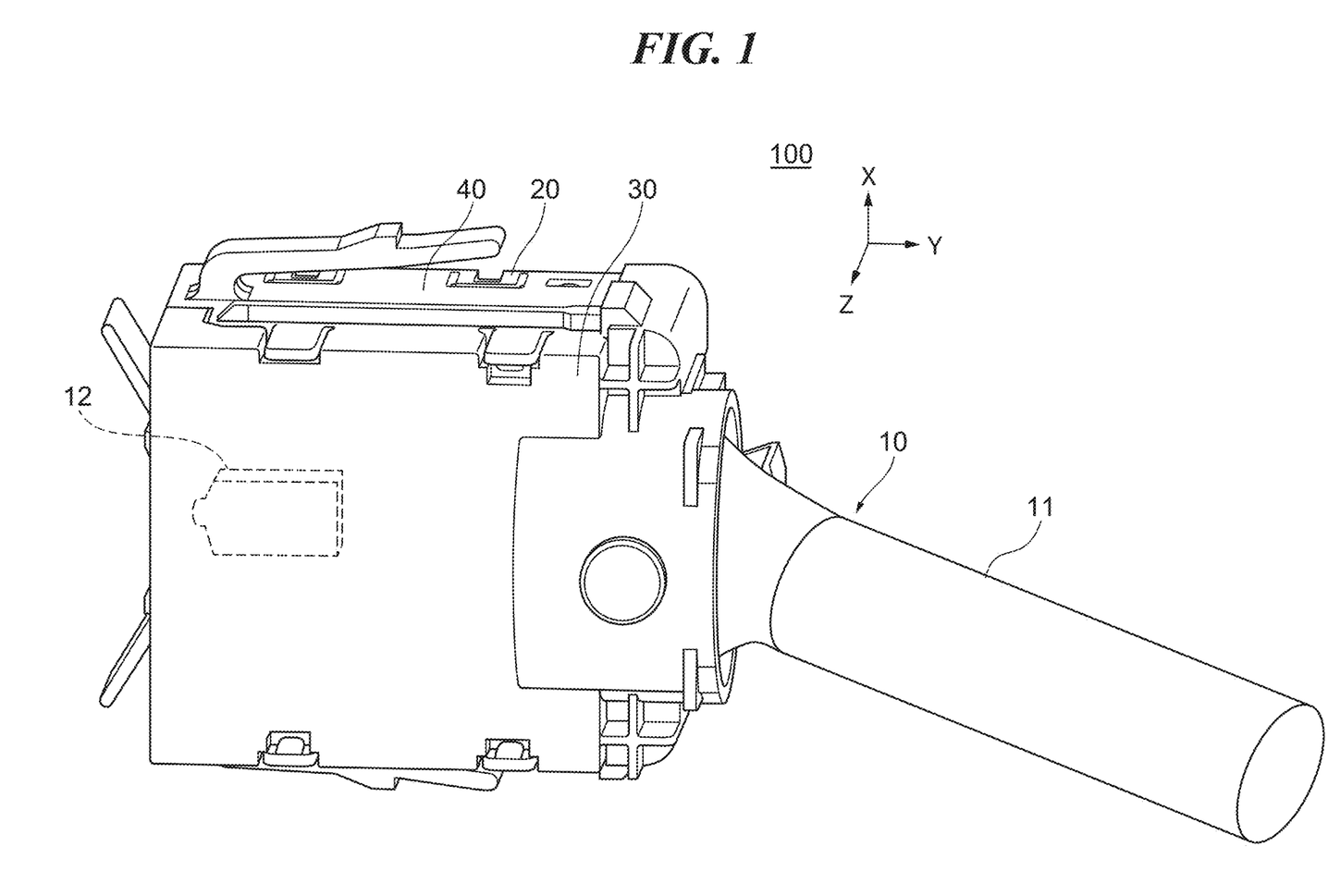
FIG. 1 is a perspective view of a lever switch.
Figure 2:
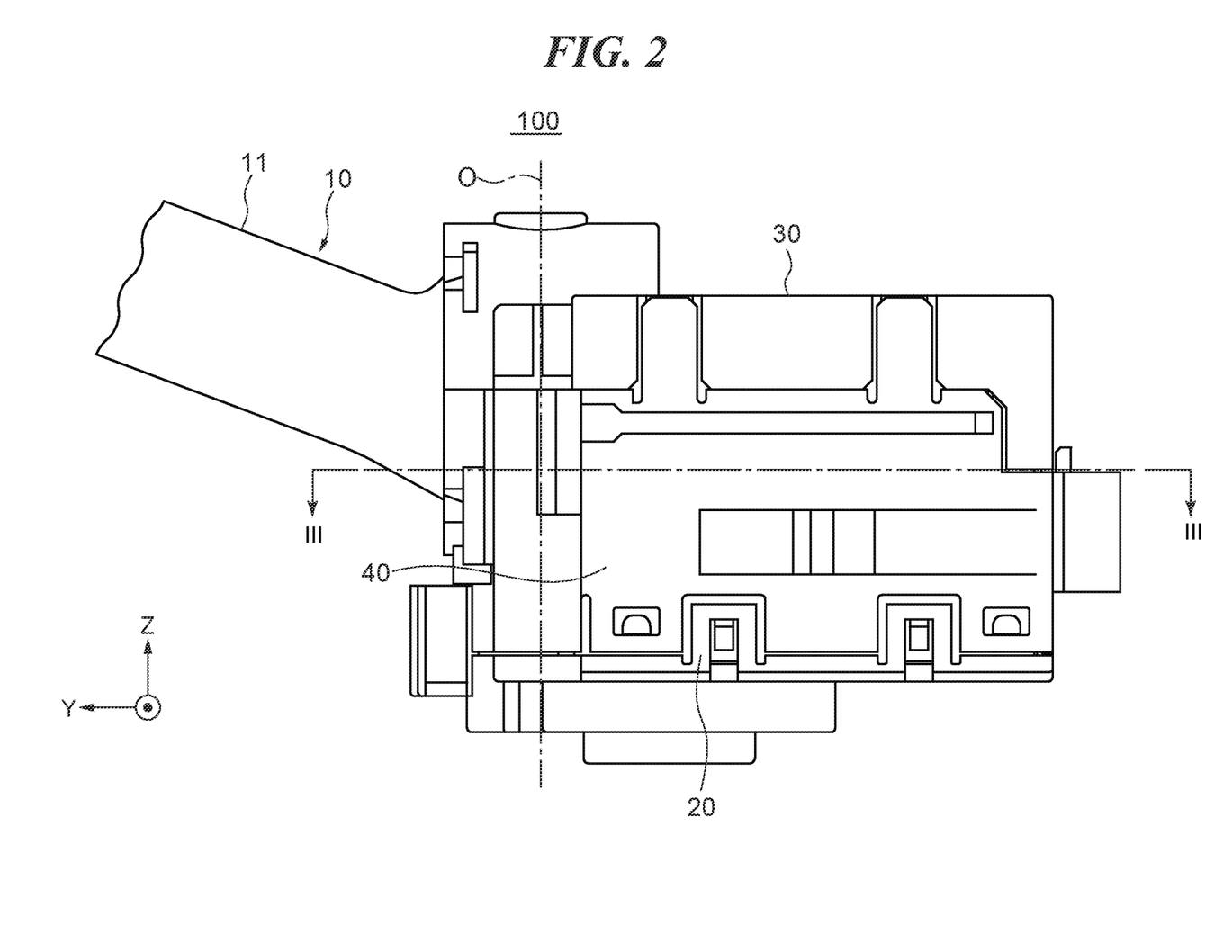
FIG. 2 is a side view of a housing.

FIG. 1 is a perspective view of a lever switch according to an embodiment of the present invention. FIG. 2 is a side view of a housing of a lever switch 100. The lever switch 100 is mounted on, for example, a vehicle, and is a structure that allows an operator to perform an operation to indicate the direction. The housing of the lever switch 100 is formed in a box shape, and mainly includes a first case 20, a second case 30, and a third case 40. In the lever switch 100, a lever body 10 is disposed so as to be turnable relative to the housing of the lever switch 100. The lever body 10 mainly includes an operation lever 11 and a switch moving body 12. The operation lever 11 is turned by a user. Hereinafter, directions are defined by using an XYZ coordinate system in FIG. 1.

Figure 3:
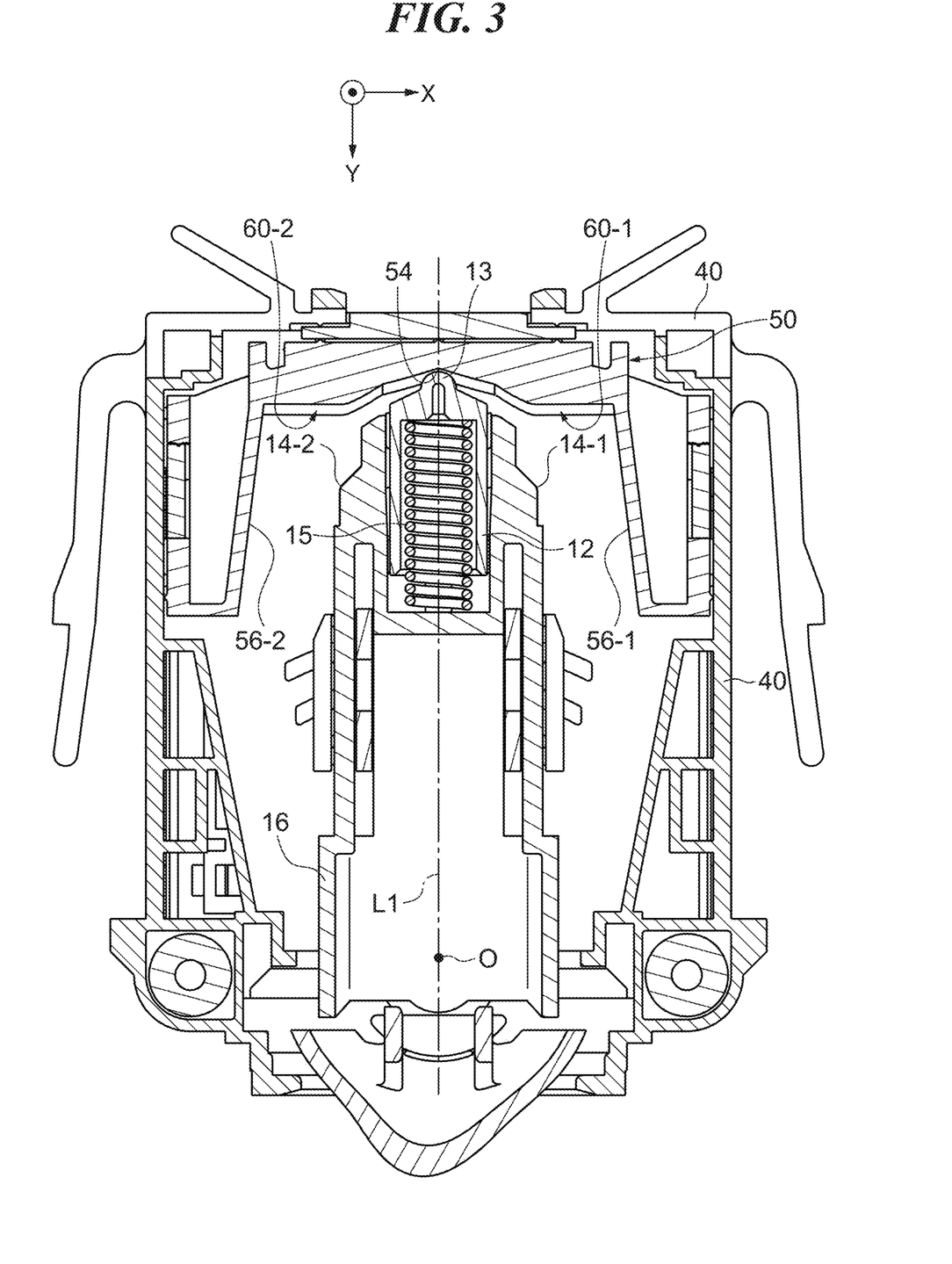
FIG. 3 is a cross-sectional view taken along line III-III in FIG. 2.

FIG. 3 is a cross-sectional view taken along line III-III in FIG. 2. In FIG. 3, main parts housed in the housing of the lever switch 100 are viewed from the Z direction, and illustration of some components is omitted. FIG. 3 mainly illustrates the third case 40, the switch moving body 12, and a click feeling generator 50.

The lever body 10 is freely turnable as a whole about a turn center O (also referred to as a turn fulcrum or a turn axis). The turn center O is substantially parallel to the Z axis. Practically, the lever body 10 is made turnable by engagement of a shaft provided on any one of the housing (at least one of the cases 20, 30, and 40) and the lever body 10 with a bearing provided on another. A virtual straight line passing through the end position of an end portion 13 of the switch moving body 12 and the turn center O is defined as L1. In the lever body 10, the operation lever 11 and the switch moving body 12 are connected via a connection body 16, a coil spring 15, and other interposed members (not illustrated). The switch moving body 12 turns in response to a user's operation of the operation lever 11. Further, the switch moving body 12 is disposed so that the switch moving body 12 can be displaced in an elastic way, by the elasticity of the coil spring 15, relative to the operation lever 11 in the direction of the virtual straight line L1.

Inside the third case 40, which has a box-like shape, the click feeling generator 50 is disposed. It should be noted that the click feeling generator 50 is fixed by engaging with the second case 30 shown in FIG. 1. The third case 40 is formed by resin. The click feeling generator 50 is formed in one body out of an elastic member having higher elasticity than that of the third case 40. A material of the click feeling generator 50 is, for example, an elastomer, but may be another elastic member. The switch moving body 12 is disposed inside the click feeling generator 50.

An inner part of the click feeling generator 50, facing the end portion 13 of the switch moving body 12, includes clicking surfaces 60-1 and 60-2 for generating a click feeling by abutting with the end portion 13. At the boundary between the clicking surfaces 60-1 and 60-2, a valley 54 is formed. The end portion 13 abuts with the clicking surfaces 60-1 and 60-2 in an elastic way by the elasticity of the coil spring 15. Therefore, along with the turn of the switch moving body 12, the end portion 13 slides on the clicking surfaces 60-1 and 60-2 while being displaced in an elastic way in the direction of the virtual straight line L1 by the elasticity of the coil spring 15. When the end portion 13 passes on the clicking surfaces 60-1 and 60-2, it makes a large change in a load required for the user to operate the operation lever 11, which is a click feeling. Details of the clicking surfaces 60-1 and 60-2 will be described later with reference to FIGS. 4 and 5.

The switch moving body 12 is turnable bidirectionally (in the +X direction and the −X direction) from a neutral position (also referred to as a non-operation position or a first angle). A turn position where the end portion 13 takes an upright position with respect to the valley 54 between the clicking surfaces 60-1 and 60-2 is the neutral position of the switch moving body 12. In FIG. 3, the switch moving body 12 is located at the neutral position. The virtual straight line L1 in a neutral state of the switch moving body 12 is substantially parallel to the Y axis. The turn-end position in the +X direction (clockwise direction in FIG. 3) of the switch moving body 12 corresponds to, for example, a right-turn indication position, and the turn-end position in the −X direction corresponds to, for example, a left-turn indication position.

A function of the vehicle corresponding to each turn position differs depending on specifications of the vehicle. It should be noted that an angle formed by the click feeling generator 50 with the switch moving body 12 is represented by an angle formed by the virtual straight line L1 and a virtual straight line passing through the turn center O and the valley 54. Therefore, a stroke in which the switch moving body 12 turns from the neutral position to the turn-end position in the +X direction (or the turn-end position in the −X direction) corresponds to a stroke in which the switch moving body 12 turns from a first angle to a second angle that is different from the first angle. It should be noted that the first angle is an angle at which the switch moving body 12 is held with facing the click feeling generator 50 and is in the neutral state, among angles formed by the switch moving body 12 with the click feeling generator 50.

The switch moving body 12 has corners 14-1 and 14-2. The click feeling generator 50 has abutting walls 56-1 and 56-2. By the +X side corner 14-1 abutting with the abutting wall 56-1, a turn range of the switch moving body 12 in the +X direction is restricted. By the −X side corner 14-2 abutting with the abutting wall 56-2, a turn range of the switch moving body 12 in the −X direction is restricted.

It should be noted that, although not illustrated, a terminal plate on which a plurality of fixed contacts are laid is arranged in the housing of the lever switch 100. Along with the turn of the switch moving body 12, a contact piece provided on the switch moving body 12 slides on the terminal plate. By the contact piece contacting with and separating from the plurality of fixed contacts, electrical contacting and separating are made.

Figure 4:
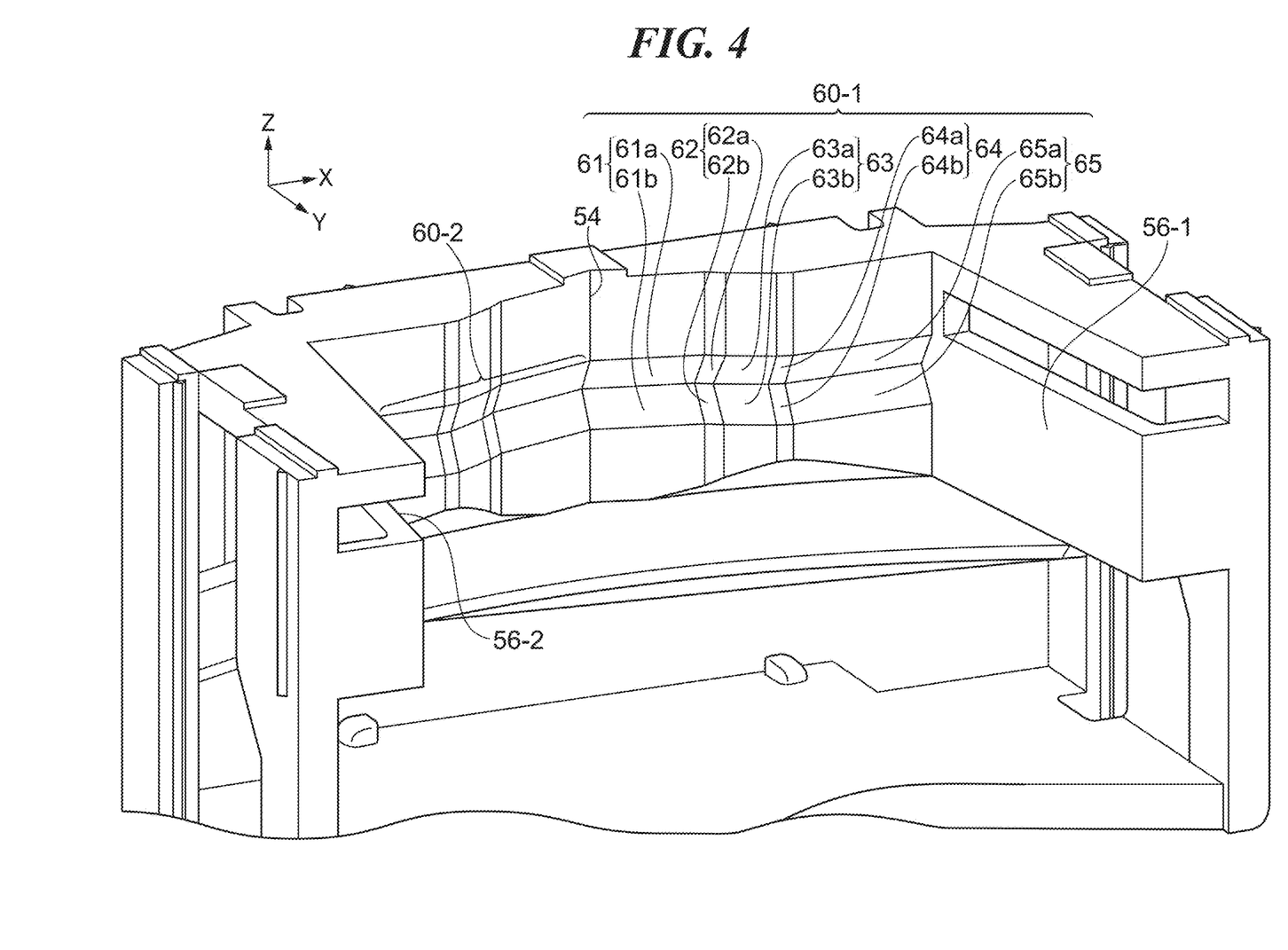
FIG. 4 is a partial perspective view of a clicking surface and a periphery thereof.

FIG. 4 is a partial perspective view of the clicking surfaces 60-1 and 60-2 and a periphery thereof. The clicking surface 60-1 and the clicking surface 60-2 are configured to be substantially line-symmetric with respect to the virtual straight line L1 in the neutral state of the switch moving body 12. Therefore, the configuration and operation of the clicking surface 60-1 are described as a representative.

The clicking surface 60-1 includes a first face 61, a second face 62, a third face 63, a fourth face 64, and a fifth face 65 that extend continuously in order from the valley 54 to the abutting wall 56-1. The first face 61 includes a +Z side face 61a and a −Z side face 61b, and is recessed toward the −Y direction. Since the end portion 13 has a curved surface shape, when sliding on the clicking surface 60-1, strictly speaking, the end portion 13 is displaced while abutting with both the +Z side face 61a and the −Z side face 61b, without abutting with a valley formed by the +Z side face 61a and the −Z side face 61b. Similarly to the +Z side face 61a and the −Z side face 61b, the second face 62, the third face 63, the fourth face 64, and the fifth face 65 respectively include the +Z side faces 62a, 63a, 64a, and 65a and the −Z side faces 62b, 63b, 64b, and 65b.

Figure 5:
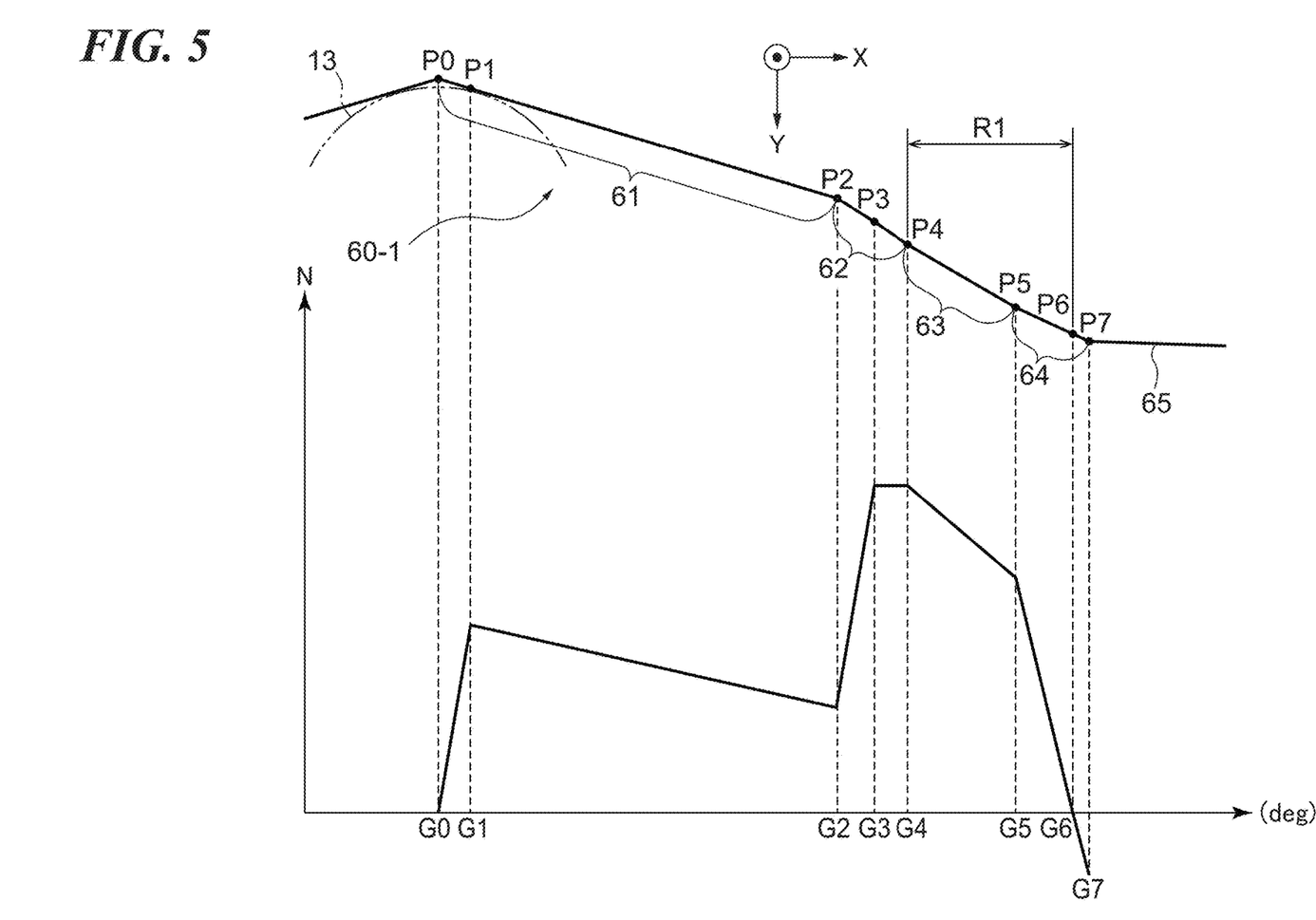
FIG. 5 is a schematic view showing a change in a reaction force (load) against an operation of a switch moving body, in correspondence to each position on the clicking surface.

FIG. 5 is a schematic view showing, in a stroke in which the switch moving body 12 turns from the non-operation position in the +X direction, a change in a reaction force (load) against the turn of the switch moving body 12 (in other words, the reaction force against an operation of the operation lever 11), in correspondence to positions on the clicking surface 60-1. FIG. 5 shows a cross section of the clicking surface 60-1 cut along an X-Y plane together with the change in the reaction force for convenience. Positions on the clicking surface 60-1 are indicated by positions P0 to P7. Further, the curve of the change in the reaction force shows transition in the stroke in which the switch moving body 12 turns from the non-operation position in the +X direction. In other words, FIG. 5 shows transition in a stroke in which the switch moving body 12 turns until an angle formed by the click feeling generator 50 with the switch moving body 12 becomes the second angle (an angle formed at the end position of the turn in the +X direction) from the first angle (an angle formed at the non-operation position). The horizontal axis indicates the turn angle (deg), and the vertical axis indicates the load (N), for showing the curve of the change of the reaction force. The non-operation position of the switch moving body 12 corresponds to a turn angle G0 and the position P0 on the clicking surface 60-1. It should be noted that the turn angle (deg) of the switch moving body 12 substantially matches an angle at which the user operates the operation lever 11. Further, a change in the load (N) against the turn of the switch moving body 12 substantially matches a change in a load required for the user to operate the operation lever 11.

It should be noted that, in the description with reference to FIG. 5, the turn position of the end portion 13 is expressed as an intersection between the virtual straight line L1 and the clicking surface 60-1, for convenience. Turn angles G1 to G7 correspond to the positions P1 to P7, but phases of both do not always match in the entire stroke since the end portion 13 has a curved surface shape. For example, depending on a change in the angle of the clicking surface 60-1, a timing at which the virtual straight line L1 reaches the valley may not match a timing at which the reaction force suddenly changes. It should be noted that, strictly speaking, the end portion 13 does not abut with a portion (each of the positions P0 and P2) serving as the valley on the clicking surface 60-1. In order to facilitate understanding, FIG. 5 correspondingly illustrates the turn angles G1 to G7 and the positions P1 to P7 while focusing on a correspondence between a position that causes a change in the reaction force and a timing at which the change in the reaction force actually occurs.

First, a description is given of the shape of the clicking surface 60-1. The first face 61 is a face in the region from the position P0 to the position P2. The second face 62 is a face in the region from the position P2 to the position P4. The third face 63 is a face in the region of from the position P4 to the position P5. The fourth face 64 is a face in the region from the position P5 to the position P7. The first face 61 and the fifth face 65 are flat faces. The second face 62, the third face 63, and the fourth face 64 each forms a shape of a convex curved face that is convex toward the turn center O (the +Y direction). It should be noted that the second face 62 may be a flat face.

A description is given of a change in the reaction force in the stroke in which the switch moving body 12 turns from the non-operation position in the +X direction (hereinafter referred to as a right-turn stroke). First, the reaction force sharply increases from the turn angle G0 to the turn angle G1. Thereafter, the reaction force gradually decreases toward the turn angle G2. Subsequently, the reaction force sharply increases when the end portion 13 abuts with the second face 62, and the reaction force has the peak from the turn angle G3 to the turn angle G4, during a period in which the end portion 13 abuts with the second face 62. It should be noted that, when the operation on the switch moving body 12 is released before the turn angle of the switch moving body 12 reaches the turn angle G3, the switch moving body 12 automatically returns to the non-operation position. The function of this operation is a function called "lane change" for lighting a turn signal a predetermined number of times.

When the turn angle of the switch moving body 12 exceeds the turn angle G4, the reaction force decreases. To the timing at which the reaction force starts to decrease from the peak, the position P4 (first position) corresponds. Thereafter, when the turn angle of the switch moving body 12 exceeds the turn angle G5, an amount of decrease of the reaction force increases, and the reaction force becomes zero at the turn angle G6. To the timing at which the reaction force becomes zero, the position P6 (second position) corresponds. After the turn angle of the switch moving body 12 exceeds the turn angle G6, the reaction force is reversed. That is, after the turn angle of the switch moving body 12 exceeds the turn angle G6, a force acts on the switch moving body 12 so as to assist the operation of the switch moving body 12 in the +X direction, rather than a reaction force that resists the operation of the switch moving body 12.

Here, the third face 63 and the fourth face 64 are convex curved faces having mutually different radii of curvature. Since a region R1 from the position P4 to the position P6 includes the entire third face 63 and a part of the fourth face 64 near the position P5, the region R1 has a shape of a convex curved surface that is convex toward the turn center O. However, the radius of curvature of the region R1 is not constant and changes at the position P5. The radius of curvature of the third face 63 (first convex curved face) is larger than the radius of curvature of the fourth face 64 (second convex curved face) in the region R1. If the shape of the region R1 is designed as a single plane or a convex curved face such that the reaction force changes at a uniform rate while the turn angle changes from the turn angle G4 to the turn angle G6, a great drop in the reaction force appears when the reaction force decreases from the peak at position P4. It deteriorates an operation feeling of the lever switch 100 at a time when a click feeling is generated. On the other hand, in the present embodiment, the region R1 includes a plurality of curved faces of the fourth face 64 and the third face 63, and the radius of curvature of the third face 63 is set to be larger than the radius of curvature of the fourth face 64. It can restrain the drop in the reaction force caused when the reaction force decreases from the peak at the position P4, and mitigate the deterioration of the operation feeling.

When the corner 14-1 abuts with the abutting wall 56-1 at the turn angle G7 (a position after the reaction force is reversed) after the turn angle of the switch moving body 12 exceeds the turn angle G6, the right-turn stroke ends. From this state, when the operator turns the switch moving body 12 in the reverse direction (the −X direction) up to a turn position where the turn angle becomes smaller than the turn angle G6, the switch moving body 12 automatically returns to the non-operation position.

Figure 6:
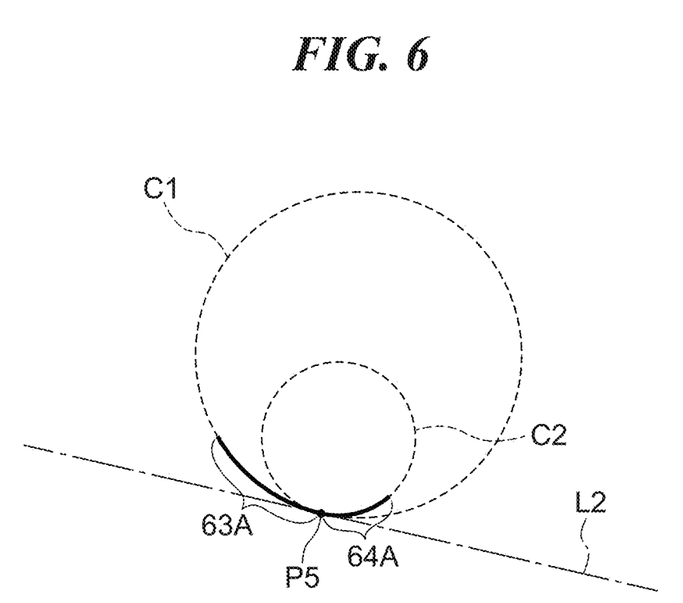
FIG. 6 is a view schematically showing a relationship between a third face and a fourth face of a clicking surface.

FIG. 6 is a view schematically showing a relationship between the third face 63 and the fourth face 64. Since the radius of curvature is too large to be visually recognized in the actual size, the radius of curvature of each face is exaggerated and shown small in FIG. 6. A circle including an arc 63A of the third face 63 is defined as C1, and a circle including an arc 64A of the fourth face 64 is defined as C2. The circle C1 is larger than the circle C2. The arc 63A and the arc 64A are convex curved faces that are continuous with each other, and the two convex curved faces adjoin at the position P5 that is a contact part. At the position P5, in the cross section of the third face 63 and the fourth face 64, or the clicking surface 60-1, orthogonal to the turn axis (turn center O) of the operation lever 11, a virtual tangent line L2 to the arc 63A that is one of the adjoining convex curved faces is common with a virtual tangent line L2 to the arc 64A that is another convex curved face. In other words, the arc 63A and the arc 64A are mutually tangent at the position P5. This makes a change in the reaction force smooth at the position P5 (turn angle G5), and improves the operation feeling of the lever switch 100 while the end portion 13 of the switch moving body 12 moves on between the adjoining convex curved faces.

It should be noted that the position P4, which corresponds to the contact part between the second face 62 and the third face 63, may have a relationship similar to that shown in FIG. 6. That is, in the cross section of the second face 62 and the third face 63, or the clicking surface 60-1, orthogonal to the turn axis (turn center O) of the operation lever 11, a virtual tangent line to the arc of the second face 62 may be common with a virtual tangent line to the arc of the third face 63, and both convex curved faces may be tangent at position P4. This makes a change in the reaction force smooth at the position P4 (turn angle G4). Here, the second face 62 is a face that the end portion 13 abuts with directly before the end portion 13 reaches the position P4 in the right-turn stroke. The third face 63 is a portion adjoining the position P4 in the region R1.

As described above, the relationship between sizes of the radii of curvature such that the radius of curvature of the third face 63 is greater than that of the fourth face 64 is met. Therefore, the radius of curvature of the region R1 is the maximum at a portion adjoining the position P4 in the region R1 (in the vicinity of the position P4 including the position P4). Further, the radius of curvature of the region R1 is the minimum at a portion adjoining the position P6 in the region R1 (in the vicinity of the position P6 including the position P6).

Conventionally, in vehicles equipped with the lane change function described above, in order to avoid a user's operation to fully turn the operation lever 11 to the right-turn or left-turn indication position in spite of user's intention to merely perform a lane change operation, a value of the peak of the reaction force tends to be set high at a position between the positions P2 to P3. Assuming that the turn angle at which the reaction force becomes zero is the same as before, setting the peak of the reaction force high at the position, increases the amount of reaction force required to be attenuated from the turn angle G4 to the turn angle G6 in comparison with before. This causes a tendency to increase the drop of the reaction force when the reaction force decreases from the peak at the position P4. As a result, an impact at the time of operation of the lever switch 100 may be transmitted to the hand and deteriorate the operation feeling of the lever switch 100.

However, in the present embodiment, the radius of curvature of the region R1 is the maximum at a portion adjoining the position P4 in the region R1 (in the vicinity of the position P4 including the position P4). As a result, while satisfying the condition that the reaction force in the right-turn stroke passes the peak at the turn angle G4 and becomes zero at the turn angle G6, it is possible to minimize the drop of the reaction force when the reaction force decreases from the peak at the position P4. Therefore, according to the present embodiment, it is possible to improve the operation feeling of the lever switch 100 when a click feeling is generated. Furthermore, by reducing the drop of the reaction force, it is also possible to restrain abnormal noises during operation of the lever switch 100, and improve operation durability of constituent members of the lever switch 100.

Further, since the third face 63 and the fourth face 64 are mutually tangent at the position P5, a change in the reaction force at the position P5 (turn angle G5) can be made smooth, and the operation feeling between the convex curved faces can be improved.

It should be noted that the region R1 has two convex curved faces having different radii of curvature, but the present invention is not limited to this. That is, it suffices that the radius of curvature of the region R1 is the maximum at a portion adjoining the position P4 in the region R1 (in the vicinity of the position P4 including the position P4). Further, in the region R1, there may be three or more convex curved faces having different radii of curvature, that is, the region R1 may be formed by three or more consecutive convex curved faces having different radii of curvature. Moreover, the configuration is not limited to the configuration in which the radius of curvature of the region R1 changes stepwise, but the radius of curvature may change gradually (change steplessly) in the region R1. In a case of such a configuration, it is preferable that the radius of curvature of the region R1 is the minimum at a portion adjoining the position P6 in the region R1 (in the vicinity of the position P6 including the position P6), but this is not indispensable.

The present invention has been described above in detail on the basis of the preferred embodiment thereof, but the present invention is not limited to the specific embodiment, and various forms within the scope of the present invention are also included in the present invention.

This application claims the benefit of Japanese Patent Application No. 2019-125834 filed on Jul. 5, 2019 which is hereby incorporated by reference herein in its entirety.

What is claimed is:

1. A lever switch comprising:
    a case;
    a click feeling generator disposed inside the case; and
    a switch moving body that is disposed inside the click feeling generator and turns with respect to the case about a turn fulcrum in response to an operation of an operation lever, wherein
    the click feeling generator includes a clicking surface that abuts with an end portion of the switch moving body and generates a click feeling by causing a reaction force against the operation of the operation lever,
    a region of the clicking surface, being from a first position to a second position, forms a shape of a convex curved face being convex toward the turn fulcrum, where the first position and the second position are a position where the reaction force starts to decrease from a peak and a position where the reaction force becomes zero, respectively, in a stroke in which the switch moving body turns from a first angle formed by the click feeling generator with the switch moving body to a second angle formed by the click feeling generator with the switch moving body and being different from the first angle, and
    a radius of curvature of the region is not constant and is a maximum at a first portion adjoining the first position in the region.

2. The lever switch according to claim 1, wherein the first angle is an angle at which the switch moving body is held with facing the click feeling generator and is in a neutral state, among angles formed by the switch moving body with the click feeling generator.

3. The lever switch according to claim 1, wherein the radius of curvature of the region is a minimum at a second portion adjoining the second position in the region.

4. The lever switch according to claim 1, wherein the region includes a plurality of convex curved faces having mutually different radii of curvature.

5. The lever switch according to claim 4, wherein, at a contact part between adjoining convex curved faces among the plurality of convex curved faces, a virtual tangent line to one of the adjoining convex curved faces and a virtual tangent line to another of the adjoining convex curved faces are common in a cross section of the adjoining convex curved faces orthogonal to a turn axis of the operation lever.

6. The lever switch according to claim 1, wherein the region includes a first convex curved face including the first portion adjoining the first position, and a second convex curved face including a second portion adjoining the second position and being continuous with the first convex curved face.

7. The lever switch according to claim 6, wherein a radius of curvature of the first convex curved face is larger than a radius of curvature of the second convex curved face.

8. The lever switch according to claim 1, wherein at a contact part between a certain face in the clicking surface and the first portion of the clicking surface adjoining the first position in the region, a virtual tangent line to the certain face and a virtual tangent line to the first portion adjoining the first position are common in a cross section of the clicking surface orthogonal to a turn axis of the operation lever, where the certain face is a face that, in the stroke in which the switch moving body turns from the first angle to the second angle, the switch moving body abuts with directly before the switch moving body reaches the first position.

* * * * *